United States Patent
Liu et al.

(10) Patent No.: US 7,309,130 B2
(45) Date of Patent: Dec. 18, 2007

(54) FIXTURE FOR PROJECTION SYSTEM

(75) Inventors: I-Hsien Liu, Miao-Li County (TW); Chien-Hung Lee, Miao-Li County (TW)

(73) Assignee: Coretronic Corporation, Miao-Li County (TW)

(*) Notice: Subject to any disclaimer, the term of this patent is extended or adjusted under 35 U.S.C. 154(b) by 118 days.

(21) Appl. No.: 11/091,439

(22) Filed: Mar. 29, 2005

(65) Prior Publication Data
US 2005/0213059 A1   Sep. 29, 2005

(30) Foreign Application Priority Data
Mar. 29, 2004   (TW) .................. 93108586

(51) Int. Cl.
G03B 21/14   (2006.01)
G03B 21/26   (2006.01)
(52) U.S. Cl. .................... 353/56; 353/119
(58) Field of Classification Search ........... 353/52, 353/56, 97, 119, 122
See application file for complete search history.

(56) References Cited

U.S. PATENT DOCUMENTS 5,313,234 A * 5/1994 Edmonson et al. ............ 353/61
6,428,170 B1 * 8/2002 Haba ........................ 353/119

* cited by examiner

*Primary Examiner*—Rodney Fuller
(74) *Attorney, Agent, or Firm*—MH2 Technology Law Group, LLP

(57) ABSTRACT

A fixture for a projection system that includes a lamp, a light valve and a projection lens mainly comprises a lamp frame and an optical engine main body, wherein the lamp frame contains a chamber for containing the optical engine main body. The optical engine main body includes an optical engine seat and an optical engine upper cover. One end of the optical engine seat is connected to the lamp frame while another end thereof is connected to the optical engine upper cover. The optical engine seat is made of a heat-insulating material for preventing the heat of the lamp from conducting to the optical engine upper cover for providing better image quality of the projection system, extending the lifetime of the light valve and the projection lens, reducing the weight and the cost of the whole projection system.

7 Claims, 3 Drawing Sheets

FIXTURE FOR PROJECTION SYSTEM

FIELD OF THE INVENTION

The present invention relates to a projection system, and more particularly, to a fixture for the projection system.

BACKGROUND OF THE INVENTION

Please refer to FIG. 1, which shows a fixture of a conventional projection system 10 for fixing the components of the projection system 10 such as a lamp, a color wheel, an integration rod, a light valve, a projection lens and so on. The fixture includes a lamp frame 111 and an optical engine main body 12, the lamp frame 111 contains a lamp 11, and an optical engine main body 12 is used to fix the optical components except the lamp 11 (for example: the color wheel, the integration rod, the light valve, the projection lens and so on). By the connection of the lamp frame 111 and one end of the optical engine main body 12, a projection system 10 is formed. Because the most components of the projection system 10 such as the lamp, the integration rod, the light valve and so on generate or accumulate heat when they are in use, thus, generally the lamp frame 111 and the optical engine main body 12 are made of metal material in order to sustain or take away the generated heat. The main heat source of the projection system 10 is from the lamp 11, and conventionally the optical engine main body 12 and the lamp frame 111 both of metal material are connected, thus the heat generated by the lamp 11 is conducted through the lamp frame 111 to the light valve and the projection lens of the optical engine main body 12. Therefore, some heat is accumulated on the light valve and the projection lens, and causes the malfunction of the light valve and decreases the image quality projected by the projection lens and reduces the lifetime of the light valve and the projection lens.

According to the demand of the high luminance of the projection system 10, the power of the lamp 11 is also raised, and then the above problems will be more serious. The conventional solution is to dispose a heat sink with large area on the light valve or a fan system to force heat dissipation. But the above solution not only increases the total weight and cost of the projection system 10 but also has poor performance of heat dissipation for the light valve and the projection lens.

SUMMARY OF THE INVENTION

One object of the present invention is to provide a fixture for the projection system by taking advantage of disposing an optical engine seat with a heat-insulating material between the lamp frame and the optical engine upper cover in order to achieve the object of preventing the heat of the lamp from transmitting to the optical engine upper cover and providing the projection system better image quality.

Another object of the invention is to provide a fixture for the projection system, by disposing a heat-insulating component between the lamp and the optical engine main body and disposing the light valve and the projection lens on the optical engine main body in order to avoid the heat conduction to the light valve and the projection lens in order to extend the lifetime of the light valve and the projection lens.

Still another object of the invention is to provide a fixture for the projection system, by taking advantage of the optical engine bottom seat of heat-insulating material to achieve the object of reducing the weight and the cost of the whole projection system.

In order to achieve the above objects, the fixture of a projection system in the present invention includes a lamp, a light valve, and a projection lens. The fixture mainly includes a lamp frame and an optical engine main body, wherein the lamp frame contains a chamber in order to contain the optical engine main body. The optical engine main body includes an optical engine seat and an optical engine upper cover, and one end of the optical engine seat is connected to the lamp frame and another end of the optical engine seat is connected to the optical engine upper cover. The optical engine seat is a heat-insulating material in order to achieve the object of preventing heat of the lamp from transferring to the optical engine upper cover for providing better image quality of the projection system, extending the lifetime of the light valve and the projection lens, reducing the weight and the cost of the whole projection system.

DESCRIPTION OF THE EMBODIMENTS

For obtaining the objects mentioned above, the method and the effect thereof are shown in a preferred embodiment accompanied with some figures for illustration.

Figure 1:
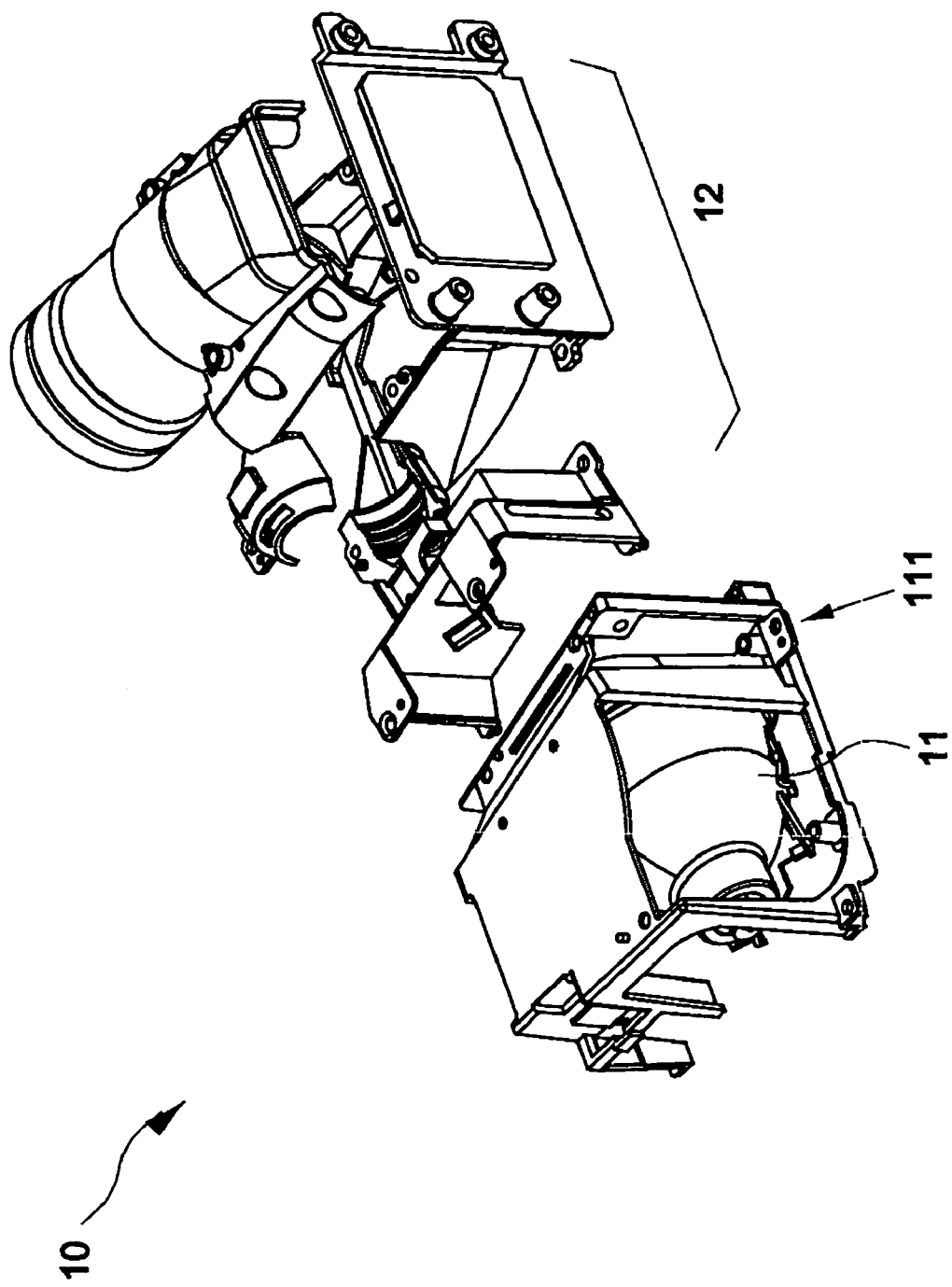
FIG. 1 is a perspective view of a conventional projection system.
Figure 2:
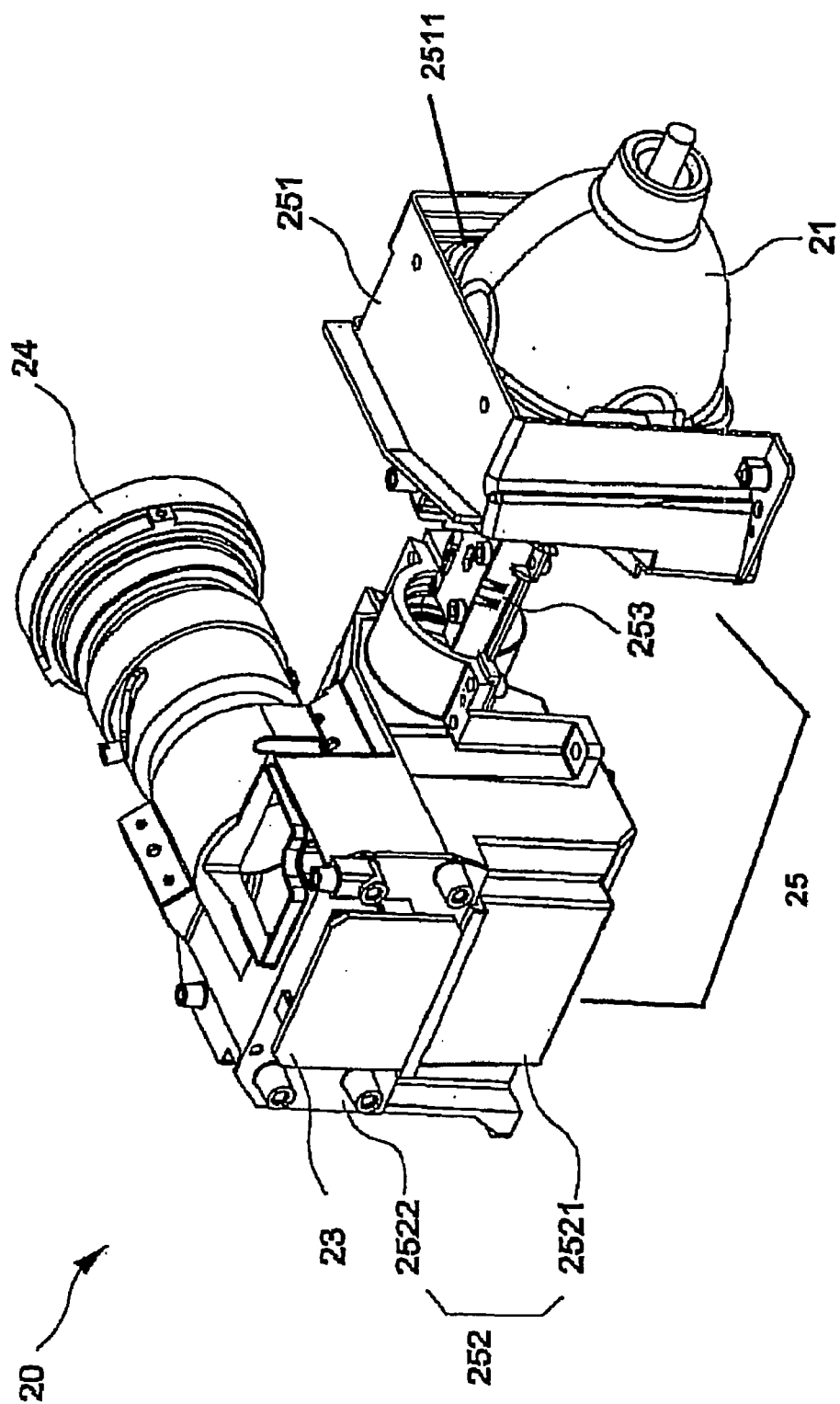
FIG. 2 is a perspective view showing the combination of the projection system in a preferred embodiment of the present invention.
Figure 3:
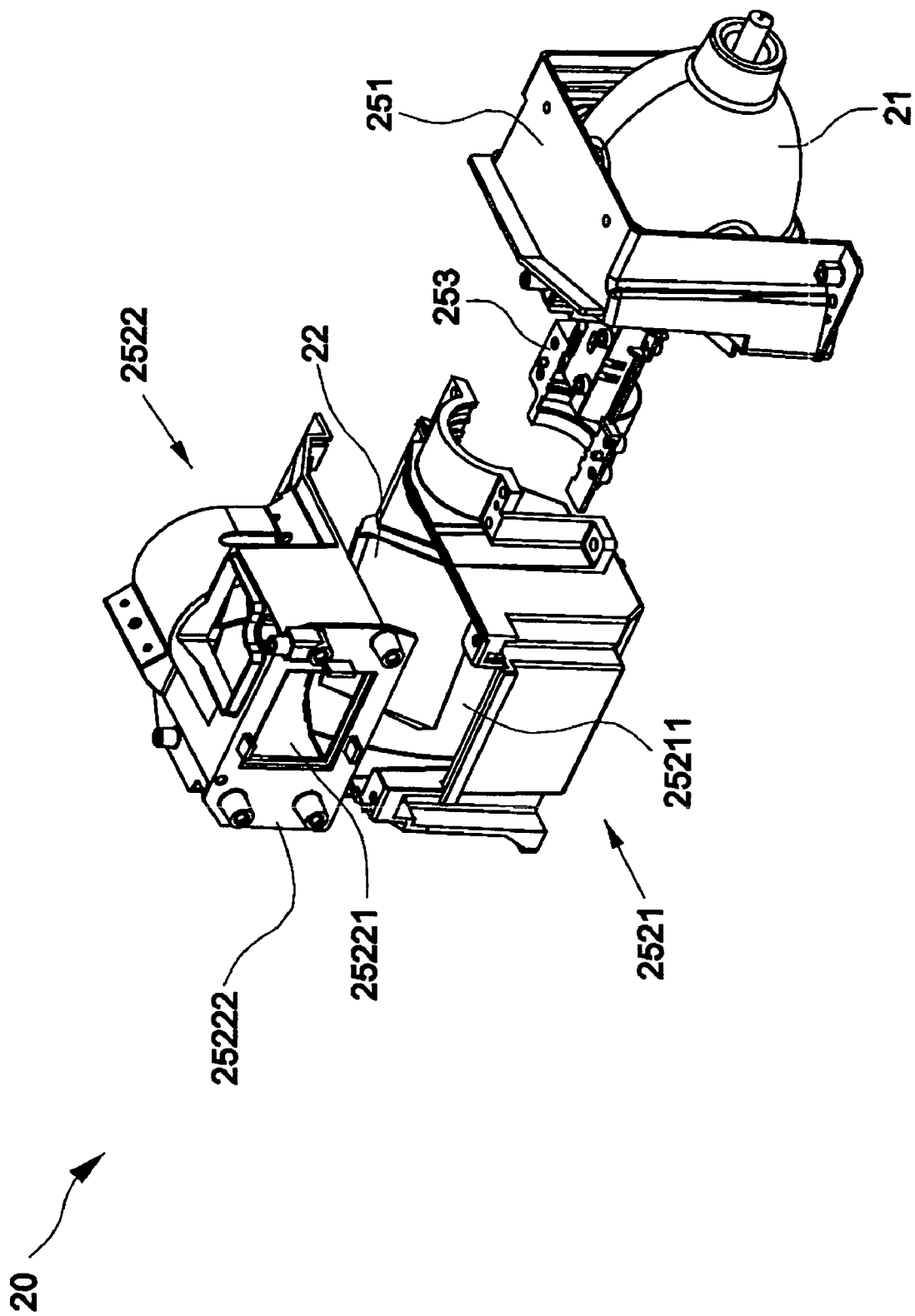
FIG. 3 is an exploded view showing the projection system in the preferred embodiment of the present invention.

Please refer to FIG. 2 and FIG. 3. The projection system 20 of the invention mainly includes a lamp 21, a plurality of optical components 22, a light valve 23, a projection lens 24 and a fixture 25 for fixing the above components. The fixture 25 is composed of a lamp frame 251 and an optical engine main body 252, and the lamp frame 251 has a first chamber 2511 in order to contain the lamp 21. The optical engine main body 252 includes an optical engine seat 2521 and an optical engine upper cover 2522, and one end of the optical engine seat 2521 is connected to the lamp frame 251 while another end thereof is connected to the optical engine upper cover 2522. The optical engine seat 2521 is connected to the lamp frame 251 by a linking component 253. The optical engine seat 2521 is made of a heat-insulating material and has a first chamber 25211 in order to contain the optical component 22 (for example: the reflective mirror). The optical engine upper cover 2522 is made of metal and includes a second chamber 25221 and a side surface 25222, and is used to fix the light valve 23 and the projection lens 24. The second chamber 25221 is disposed facing the optical engine seat 2521 in order to form an interlinked and close space between the first chamber 25211 and the second chamber 25221 for the light beam of the projection system 20 to pass easily. The light valve 23 is fixed to the side surface 25222, and the projection lens 24 is disposed in front of the side surface 25222, and part of the projection lens 24 is stretched into the second chamber 25222. The linking component 253 is semicircle-shaped and metallic, and it stretches from one side of the lamp frame 251 horizontally to be linked to the optical engine seat 2521. The linking component 253 can fix the optical components such as the color wheel, the integration rod or the projection lens (not shown in the figure), and thereby a projection system 20 is composed.

After the projection system 20 is on, the heat generated by the lamp 21 is taken away through the lamp frame 251 or be conducted to the linking component 253, and the heat conducted to the linking component 253 is insulated by the optical engine seat 2521 of a heat-insulating material in order not to be transferred from the optical engine seat 2521 to the light valve 23 and the projection lens 24 on the optical engine upper cover 2522. Therefore, the heat of the lamp 21 is prevented from being conducted through the fixture 25 to the light valve 23 and the projection lens 24, and the lifetime of the light valve 23 and the projection lens 24 is extended and the performance of the optical components is not affected. Furthermore, the heat generated by the light valve 23 is dissipated by the optical engine upper cover 2522, and then is partially conducted to the optical engine seat 2521, and through the insulation of the optical engine seat 2521, the heat is prevented from being conducted to the lamp 21 in order not to raise the temperature of the lamp. Therefore, by taking advantage of the fixture with heat-insulating design of the present invention, we can effectively avoid the improper conduction of heat, solve the problem that component temperature raises because of heat conduction, and achieve the object that each component of the projection system 20 is at its best performance.

For the demand of high luminance of the projection system 20, the power of the lamp 21 will be higher, and the heat produced by the lamp 21 will be much more. By taking advantage of the heat-insulating material (for example: plastics) of the optical engine seat 2521 in the present invention, the heat generated by the lamp 21 is prevented from transmitting to the light valve 23 and the projection lens 24. Then the temperature of the light valve 23 and the projection lens 24 is held in a proper range and the light valve 23 and the projection lens 24 can operate normally in order to obtain better image quality. In addition, the present invention is to dispose the optical engine seat 2521 of a heat-insulating material between the lamp 21 and the optical engine upper cover 2522 in order to act as the heat-insulating material and achieves the object of reducing the weight and the cost of the whole projection system 20.

Moreover, another embodiment of the present invention is to connect the optical engine seat 2521 with the optical engine upper cover 2522 to form an optical engine main body 252. The optical engine main body 252 is for fixing the light valve and the projection lens. Both the optical engine seat 2521 and the optical engine upper cover 2522 are made of metal materials, wherein a heat-insulating component (not shown in the figures) is disposed at the connecting section between the optical engine main body 252 and the lamp frame 251. The materials of the heat-insulating component such as plastic materials do not conduct heat. The shape of the heat-insulating component is designed according to the cross-sectional shape of the connecting section, and the heat-insulating component can totally or partially contact the optical engine main body 252 and the lamp frame 251. By disposing the heat-insulating component, the heat-conduction path between the lamp frame 251 and the optical engine main body 252 is insulated for extending the lifetime of the light valve and the projection lens without affecting the optical performance.

Although the invention has been described in detail herein with reference to its preferred embodiment, it is to be understood that this description is by way of example only, and is not to be interpreted in a limiting sense. It is to be further understood that numerous changes in the details of the embodiment of the invention, and additional embodiments of the invention, will be apparent, and may be made by persons of ordinary skill in the art having reference to this description. It is considered that such changes and additional embodiments are within the spirit and true scope of the invention as claimed below.

What is claimed is:

1. A fixture for a projection system, the projection system including a lamp, a light valve and a projection lens, the fixture comprising:

a lamp frame having a chamber for containing the lamp; and an optical engine main body having an optical engine seat and an optical engine upper cover, one end of the optical engine seat being connected to the lamp frame and another end of the optical engine seat being connected to the optical engine upper cover, the optical engine seat being made of a heat-insulating material, wherein the light valve is connected onto the optical engine upper cover, the projection lens is connected to the optical engine upper cover, and the optical engine seat is connected between the lamp frame and the optical engine upper cover so as to insulate heat generated by the lamp from transmitting to the optical engine upper cover via heat conduction.

2. The fixture for a projection system according to claim 1, wherein the optical engine upper cover is used to fix the light valve and the projection lens.

3. The fixture for a projection system according to claim 1, wherein the heat-insulating material is plastic.

4. The fixture for a projection system according to claim 1, wherein a linking component is disposed between the lamp frame and the optical engine seat.

5. The fixture for a projection system according to claim 1, wherein the optical engine cover is made of a metal material.

6. A fixture for a projection system, the projection system including a lamp, a light valve and a projection lens, the fixture comprising:

a lamp frame having a chamber for containing the lamp;

an optical engine main body connected to the lamp frame for fixing the light valve and the projection lens, wherein the optical engine main body is divided into an optical engine seat and an optical engine upper cover disposed on the top of the optical engine seat, and wherein the optical engine upper cover is made of a metal material; and a heat-insulating component disposed at a connecting section between the lamp frame and the optical engine main body, wherein the heat-insulating component is connected onto the optical engine main body so as to insulate heat generated by the lamp from transmitting to the optical engine main body via heat conduction.

7. The fixture for a projection system according to claim 6, wherein the heat-insulating component is plastic.

* * * * *